F. P. MILLER.
TURRET ATTACHMENT FOR LATHES.
APPLICATION FILED DEC. 5, 1916.

1,236,200.

Patented Aug. 7, 1917.

WITNESSES
Frederick Wiehl.
Rev. G. Horstri

INVENTOR
Frank P. Miller
BY Munn & Co
ATTORNEYS

UNITED STATES PATENT OFFICE.

FRANK P. MILLER, OF MEADVILLE, PENNSYLVANIA.

TURRET ATTACHMENT FOR LATHES.

1,236,200.   Specification of Letters Patent.   Patented Aug. 7, 1917.

Application filed December 5, 1916.   Serial No. 135,187.

*To all whom it may concern:*

Be it known that I, FRANK P. MILLER, a citizen of the United States, and a resident of Meadville, in the county of Crawford and State of Pennsylvania, have invented a new and Improved Turret Attachment for Lathes, of which the following is a full, clear, and exact description.

The invention relates to turret attachments for lathes such as shown and described in the Letters Patent of the United States, No. 1,196,575, granted to me on August 29, 1916.

The object of the present invention is to provide a new and improved turret attachment for lathes arranged to securely hold the tool-carrying member locked in the desired indexing position.

In order to accomplish the desired result use is made of a turret head having tool-holding means, a support for the said turret head to turn on and to slide in the direction of the axis of the said head, means for raising and lowering the said turret head on the said support, and locking means having members, of which one is on the said turret head and the other is on the said support, the said locking means moving into engagement on lowering the turret head, and the said locking means moving out of engagement on raising the turret head to allow the latter to be turned.

A practical embodiment of the invention is represented in the accompanying drawings forming a part of this specification, in which similar characters of reference indicate corresponding parts in both views.

Figure 1:
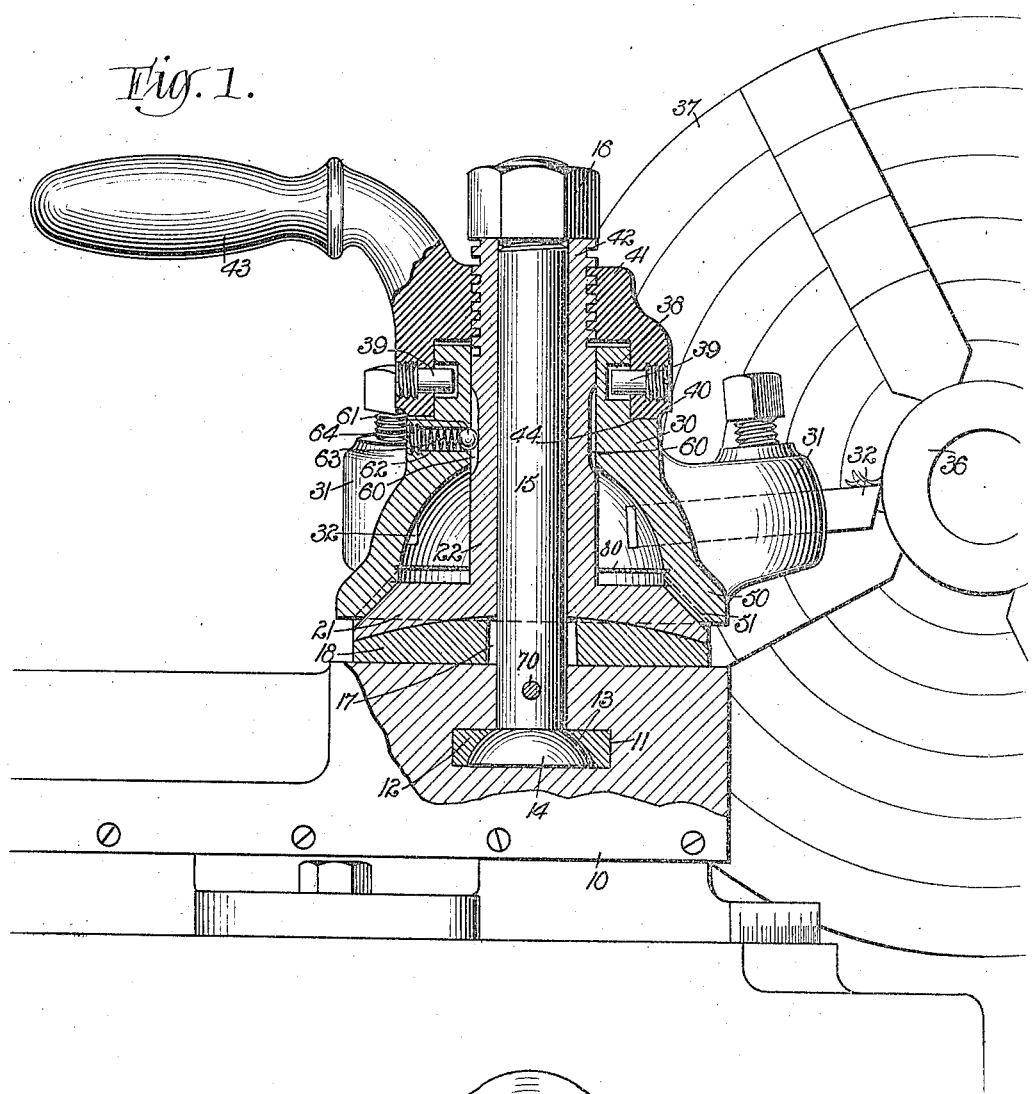
Figure 2:
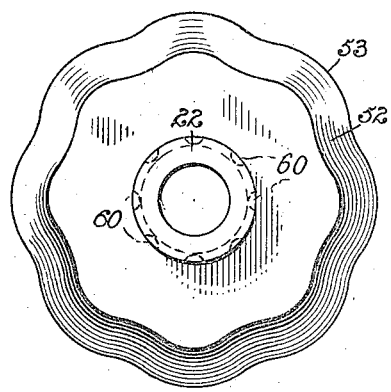

Figure 1 is a cross section of the turret attachment as applied, parts being shown in elevation; and Fig. 2 is a plan view of the sleeve on which the turret head is mounted to turn and to slide.

The turret attachment is arranged for removable attachment to a compound tool rest 10 of usual construction, and having a T-shaped slot 11 in which is mounted to slide a clamping plate 12 provided on its under side with a spherical recess 13 engaged by a correspondingly shaped head 14 of a post 15 to provide a ball and socket joint connection between the clamping plate 12 and the post 15. The upper end of the post 15 is threaded and on this end screws a nut 16. The post 15 extends loosely through a central aperture 17 formed in a clamping plate 18 resting on top of the tool rest 10 and extending across the top of the slot 11. The upper surface of this clamping plate 18 is made convex on which fits the concave under side of a base 21 formed on a sleeve 22 through which extends the post 15, on which latter the sleeve is mounted in turn.

On the sleeve 22 is mounted to turn the upper portion of a turret head 30 capable of moving lengthwise on the sleeve 22, as hereinafter more fully explained. The turret head 30 is provided with a number of tool holders 31, preferably four in number, as more fully illustrated in my patent above referred to, to accommodate tools 32 having differently shaped cutting edges. The tool holders 31 are arranged to hold the tools in planes at angles to the axis of the head 30, which latter can be readily turned to move any one of the tools 32 into cutting position relative to the work 36 held on the usual face chucks 37 of the lathe or other means, as indicated in Fig. 1. The upper portion of the turret head 30 is provided with an annular groove 38 into which project pins 39 screwed or otherwise fastened in a flange 40 depending from a nut 41 screwing on the upper threaded end 42 of the sleeve 22. The nut 41 is provided with a suitable handle 43 under the control of the operator to permit of screwing the nut 41 upward or downward on the threaded end 42 of the sleeve 22. By connecting the flange 40 of the nut 41 with the turret head 30 by the use of the pins 39 engaging the groove 38 it is evident that the turret head 30 moves lengthwise on the sleeve 22 when screwing the nut 41 downward or upward on the threaded end 42 of the sleeve 22. The lower end of the depending flange 40 of the nut 41 is seated on a shoulder 44 formed on the turret head 30 to insure a positive downward movement of the turret head without undue strain on the pins 39.

The lower portion of the turret head 30 is preferably of bell shape terminating in an annular flange 50 having a beveled edge 51 provided with regular undulations adapted to register with corresponding undulations 52 formed on the beveled edge 53 of the flange 21 of the sleeve 22, as plainly indicated in the drawings. It will be noticed that when the undulations of the flange 50 engage the undulations of the flange 21 then the turret head 30 is held in locked position against rotation, and when it is desired to rotate the turret head 30 it is first necessary to move the same upward by turning the nut 41 correspondingly to disengage the flange 50 from the flange 21. When this has been done the turret head can be turned to move the corresponding cutting tool 32 into position relative to the work 36 to be turned at the time.

In order to enable the user to perceive when the undulations of the flanges 50 and 21 are in register with each other, the following arrangement is made: The sleeve 22 is provided on its peripheral face with lengthwise extending grooves 60 spaced equal distances apart and corresponding in number to the undulations on the flange 21 of the sleeve. A ball 61 is adapted to engage any one of the grooves 60 and is mounted in a bore 62 formed in the upper portion of the turret head 30. A spring 63 presses with its inner end on the ball 61 to hold the latter in engagement with the corresponding groove 60. The outer end of the spring abuts against a closing plug 64 screwing in the outer end of the bore 62, as plainly shown in Fig. 1. When the ball 61 engages one of the grooves 60 then the corresponding undulations of the flanges 50 and 21 are in register with each other, and when the operator now turns the nut 41 to screw the same in a downward direction then the undulations move into firm registry with each other thus locking the turret head 30 against accidental turning at the same time holding the corresponding tool 32 in proper relation to the work 36.

It is understood that on loosening the nut 16, the post 15 can be readily swung into an angular position, and in doing so the post carries the sleeve 22 and the head along, and when the several parts have reached the desired position the nut 16 is screwed up to clamp the post 15 in whatever position it may be in at the time.

It is also understood that between the top of the turret head 30 and the nut 16 are sufficient screw threads 42 for the nut 41 to screw outward or downward for raising or lowering the turret head 30, whenever it is desired to turn the same for the purpose above described.

In order to prevent the post 15 from rotating when tightening the nut 16, use is made of a pin 70 inserted through registering apertures in the tool rest 10 and the post 15. A ring-shaped protecting plate 80 is inserted in a counterbored groove 81 inside of the turret head 30 adjacent the base thereof and below the apertures through which extend the tools 32 so that any chips or dirt that may work through such tool apertures is prevented from lodging between the contacting undulating surfaces. The sleeve 22 passes through the opening of the plate 80.

Having thus described my invention, I claim as new and desire to secure by Letters Patent:—

1. A turret attachment for a lathe, comprising a turret head having tool holding means, a support for the said turret head to turn and to slide on in the direction of the axis of the said head, the said support comprising a sleeve having a flange at its lower end, means for raising and lowering the said turret head on the said support, and locking means having members of which one is on the lower end of said turret head and the other is on the flange of said sleeve, the said locking means moving into engagement on lowering the turret head and the said locking means moving out of engagement on raising the turret head to allow the latter to be turned.

2. A turret attachment for a lathe, comprising an attaching means for removably clamping the attachment to a tool rest, the attaching means including a sleeve having a flange at its lower end, a turret head mounted to turn on the said sleeve of the attaching means and provided with a number of tool holding devices, the turret head having an annular flange at its lower end, manually controlled clamping, raising and lowering means for clamping the head in position after being adjusted with one of the tools in cutting position relative to the work and for raising and lowering the turret head, and locking means having members on the flange of said head and the flange of said sleeve to lock the same together on lowering the turret head and to unlock the said turret head from the sleeve of the attaching means on raising the turret head.

3. A turret attachment for a lathe, comprising a turret head having tool holding means and having an annular flange at one end, a sleeve on which the said turret head is mounted to turn and to slide in the direction of the axis of the sleeve, the sleeve having a flange at one end, a nut screwing on the other end of said sleeve and engaging the said turret head to raise or lower the latter and clamp it in position on the sleeve, and interlocking means on the flange of said turret head and flange of said sleeve to lock the turret against turning on lowering the turret head and to unlock the turret head on raising the same.

4. A turret attachment, comprising a sleeve having a base provided with a beveled edge, a turret head mounted to turn on the said sleeve and to slide lengthwise thereon, the turret head having an annular beveled flange at its base, the beveled flange of the said turret head and the beveled edge of said sleeve base having interlocking members, and a nut screwing on the said sleeve and engaging the said turret head to slide the turret on the sleeve to engage and disengage the said interlocking members.

5. A turret attachment, comprising a sleeve having a base, a turret head mounted to turn on the said sleeve and to slide lengthwise thereon, the base of the said turret head and the said sleeve base having beveled edges provided with interlocking members, a nut screwing on the said sleeve and engaging the said turret head to slide the turret on the sleeve to engage and disengage the said interlocking members, and indicating clicking means on the said turret head and engaging the said sleeve to indicate the positions of the turret head on turning the latter on the sleeve.

6. A turret attachment, comprising a sleeve having a base beveled at its edge, a turret head mounted to turn on the said sleeve and to slide lengthwise thereon, the base of the said turret head being beveled at its inner face, the beveled portions of the base of the turret head and the said sleeve base having interlocking members, a nut screwing on the said sleeve and engaging the said turret head to slide the turret on the sleeve to engage and disengage the said interlocking members, and indicating clicking means on the said turret head and engaging the said sleeve to indicate the positions of the turret head on turning the latter on the sleeve, the said locking members and the said indicating clicking means being in register.

7. A turret attachment, comprising a sleeve having a flange base, the edge of which is beveled and provided with undulations, a turret head mounted to turn on the said sleeve and to slide lengthwise thereon, the lower portion of the turret head being bell shaped and terminating in a beveled base, the beveled base being provided with undulations to fit the undulations of said sleeve base, and manually controlled means for imparting a sliding movement to the said turret head relative to the said sleeve to move the said bases into or out of locking engagement one relative to the other.

8. A turret attachment, comprising a sleeve having a flange at its lower end forming a base, the edge of said flange being beveled and provided with undulations, a turret head mounted to turn on the said sleeve and to slide lengthwise thereon, the turret head having its lower portion bell shaped and terminating in a base beveled on its inner face and provided with undulations to fit the undulations of said sleeve flange, and a handled nut screwing on the said sleeve and engaging the said turret head to seat the base thereof on the said sleeve base, the said turret head having an annular groove and the said nut having pins engaging the said groove.

9. A turret attachment, comprising a sleeve having a flange base, the edge of which is beveled and provided with undulations, a turret head mounted to turn on the said sleeve and to slide lengthwise thereon, the turret head having its base beveled on the inner face and provided with undulations to fit the said sleeve flange, a handled nut screwing on the said sleeve and engaging the said turret head to slide the latter on the sleeve, recesses lengthwise on the sleeve, and corresponding in number to the undulations on the sleeve base, and a spring-pressed ball on the said head adapted to engage the said recesses on turning the turret head.

10. A turret attachment for a lathe, comprising a turret head having tool holding means, the turret head being bell shaped at its lower portion and terminating in an annular flange, a support for the said turret to turn on and to slide on in the direction of the axis of the said head, the said support and the flange of the said head having contacting undulating surfaces, and a ring-shaped protecting plate in the lower portion of said head adjacent the said flange.

11. In combination with a tool rest, a post having a head, a clamping plate held in the said tool rest and engaged by the said post head to provide a ball and socket joint, a second clamping plate resting on top of the tool rest and through which the said post loosely extends, a sleeve held on the said post and having a base fitting on the last mentioned clamping plate, a turret head mounted on the said sleeve, a handled nut screwing on the said sleeve and engaging the said turret head, a nut on the upper end of the said sleeve, and a pin engaging the said tool rest and the said post to hold the latter against turning on screwing up the said post nut.

FRANK P. MILLER.

Copies of this patent may be obtained for five cents each, by addressing the "Commissioner of Patents, Washington, D. C."